(12) United States Patent
Hirose et al.

(10) Patent No.: US 7,881,043 B2
(45) Date of Patent: Feb. 1, 2011

(54) WOUND ELECTRIC DOUBLE-LAYER CAPACITOR

(75) Inventors: Eri Hirose, Kyoto (JP); Yoshinori Takamuku, Kyoto (JP); Yasuyuki Ito, Osaka (JP); Satomi Onishi, Osaka (JP)

(73) Assignee: Panasonic Corporation, Osaka (JP)

( * ) Notice: Subject to any disclaimer, the term of this patent is extended or adjusted under 35 U.S.C. 154(b) by 575 days.

(21) Appl. No.: 12/065,637

(22) PCT Filed: Nov. 21, 2006

(86) PCT No.: PCT/JP2006/323179

§ 371 (c)(1),
(2), (4) Date: Mar. 4, 2008

(87) PCT Pub. No.: WO2007/063742

PCT Pub. Date: Jun. 7, 2007

(65) Prior Publication Data

US 2009/0310281 A1    Dec. 17, 2009

(30) Foreign Application Priority Data

| Dec. 1, 2005 | (JP) | ............... 2005-347623 |
| Dec. 1, 2005 | (JP) | ............... 2005-347624 |
| Jan. 26, 2006 | (JP) | ............... 2006-017121 |

(51) Int. Cl.
    *H01G 9/00*    (2006.01)
(52) U.S. Cl. ............ 361/502; 361/503; 361/504; 361/508; 361/512; 361/523
(58) Field of Classification Search ......... 361/502, 361/503–504, 508–512, 516–519, 523–525, 361/528–529, 540–541; 29/25.01, 25.03
See application file for complete search history.

(56) References Cited

U.S. PATENT DOCUMENTS 5,448,448 A    9/1995    Fujiwara et al.

(Continued)

FOREIGN PATENT DOCUMENTS

JP    48-34035    4/1973

(Continued)

OTHER PUBLICATIONS

International Search Report issued Feb. 27, 2007 in the International (PCT) Application of which the present application is the U.S. National Stage.

(Continued)

*Primary Examiner*—Nguyen T Ha
(74) *Attorney, Agent, or Firm*—Wenderoth, Lind & Ponack, L.L.P.

(57) ABSTRACT

A wound electric double-layer capacitor suppresses electrochemical reaction on polarized electrode layers, reduces characteristic degradation, and has high reliability. The capacitor has a capacitor element formed by winding positive and negative electrodes with a separator interposed between them, a metal case for storing the capacitor element and an electrolyte for driving, and a sealing member for sealing an opening of the metal case. In the positive and negative electrodes, positive and negative electrode lead wires are coupled to exposed parts of current collectors having polarized electrode layers on their both surfaces, respectively. The negative electrode is wound at least one extra turn from the winding end of the positive electrode of the capacitor element, and hence a part where the polarized electrode layers formed in the negative electrode face each other through the separator is formed on the outermost periphery of the capacitor element.

18 Claims, 9 Drawing Sheets

U.S. PATENT DOCUMENTS

| | | | |
|---|---|---|---|
| 5,870,275 A * | 2/1999 | Shiono et al. | 361/504 |
| 6,222,720 B1 * | 4/2001 | Aoki et al. | 361/301.5 |
| 6,246,568 B1 * | 6/2001 | Nakao et al. | 361/502 |
| 6,307,733 B1 * | 10/2001 | Maruyama et al. | 361/511 |
| 6,310,756 B1 | 10/2001 | Miura et al. | |
| 6,762,926 B1 * | 7/2004 | Shiue et al. | 361/502 |
| 7,382,602 B2 * | 6/2008 | Sakata et al. | 361/502 |
| 7,394,648 B2 | 7/2008 | Kondo et al. | |

FOREIGN PATENT DOCUMENTS

| | | |
|---|---|---|
| JP | 4-361517 | 12/1992 |
| JP | 9-017695 | 1/1997 |
| JP | 10-270293 | 10/1998 |
| JP | 2000-315632 | 11/2000 |
| JP | 2001-237150 | 8/2001 |
| WO | 2005/069321 | 7/2005 |

OTHER PUBLICATIONS

International Search Report issued in International (PCT) Application No., dated Feb. 27, 2007.

Partial English Translation of JP 2001-237150 having a publication date of Aug. 31, 2001, pp. 1-3.

* cited by examiner

WOUND ELECTRIC DOUBLE-LAYER CAPACITOR

TECHNICAL FIELD

The present invention relates to a wound electric double-layer capacitor used in various electronic devices.

BACKGROUND ART

FIG. 10A is an exploded perspective view showing a structure of a conventional wound electric double-layer capacitor used in various electronic devices. FIG. 10B is a developed perspective view showing a structure of a capacitor element used in the capacitor. In FIG. 10A and FIG. 10B, capacitor element 431 is formed by winding positive electrode 434 and negative electrode 435 in a state where separator 436 is interposed between them.

Each of positive electrode 434 and negative electrode 435 is formed by disposing polarized electrode layers (not shown) on both surfaces of a current collector (not shown) made of a metal foil, and positive electrode lead wire 432 is coupled to positive electrode 434, and negative electrode lead wire 433 is coupled to negative electrode 435.

Capacitor element 431 having such a structure is impregnated with an electrolyte for driving (not shown), and then inserted into closed-end cylindrical metal case 438. Rubber-made sealing member 437 having holes into which positive electrode lead wire 432 and negative electrode lead wire 433 are inserted is disposed on the opening of metal case 438. Then, the outer periphery of the opening of metal case 438 is drawing-processed to the inside to perform sealing.

The polarized electrode layers formed in positive electrode 434 and negative electrode 435 are produced by mixing carbon black as activated carbon powder and a conductive adding agent, polytetrafluoroethylene as a binder, a water-soluble binder of carboxymethyl cellulose (hereinafter referred to as "CMC"), sufficiently kneading them with a kneader to produce paste, applying this paste to front and rear surfaces of the current collector made of an aluminum foil, and drying them. Positive electrode 434 and negative electrode 435 are formed in substantially the same size.

For improving the coupling of positive electrode lead wire 432 and negative electrode lead wire 433 to the aluminum foil of the current collector, the coupling part is formed by partially removing the polarized electrode layers to expose the aluminum foil of the current collector.

Conventional art document information related to the present invention is disclosed by patent document 1 and patent document 2, for example.

FIG. 11A is a sectional view showing a structure of another conventional wound electric double-layer capacitor. FIG. 11B is a developed perspective view showing the structure of a capacitor element used in this capacitor. FIG. 11C is a perspective view of this capacitor element. In FIG. 11A, FIG. 11B, and FIG. 11C, capacitor element 531 is stored in metal case 538 together with metal plate 537 and electrolyte for driving (not shown), and the opening of metal case 538 is sealed by terminal plate 540 via rubber 539 for sealing, thereby forming the conventional wound electric double-layer capacitor.

Capacitor element 531 is described hereinafter. Capacitor element 531 is formed by stacking and winding band-like anode foil 532 and band-like cathode foil 533 through band-like separator 534. Anode foil 532 has drawing electrode 535 on one longitudinal side thereof, and cathode foil 533 has drawing electrode 536 on the other longitudinal side thereof.

Anode foil 532 and cathode foil 533 are described hereinafter. Anode foil 532 and cathode foil 533 are electrodes that have a polarized electrode layer on a metal foil (not shown) and are formed in substantially the same size. The polarized electrode layer is produced by mixing carbon black as activated carbon powder and a conductive adding agent, polytetrafluoroethylene as a binder, a water-soluble binder of carboxymethyl cellulose (CMC), sufficiently kneading them with a kneader to produce paste, applying this paste to the surface of the metal foil, and drying them.

Drawing electrodes 535 and 536 are welded to the inner bottom surface of metal case 538 and the inner surface of metal plate 537, respectively. Metal plate 538 and metal case 537 are coupled to outer terminals 541 and 542, respectively.

For improving the coupling between metal case 538 and metal plate 537, polarized electrode layers are formed on surfaces of anode foil 532 and cathode foil 533 except the ends of the metal foils. Alternatively, the ends having no polarized electrode layer may be used as electrodes 535 and 536 by removing the polarized electrode layers formed on the surfaces of the ends of the metal foils.

As a conventional example, the outermost periphery of capacitor element 531 is made of cathode foil 533. When polarized electrode layers are formed on both surfaces of the metal foil, however, separator 534 may be disposed on the outermost periphery so as to prevent the contact of metal case 538 with the polarized electrode layers.

Conventional art document information related to the present invention is disclosed by patent document 3, for example.

However, the former conventional wound electric double-layer capacitor is designed so that the capacity of positive electrode 434 is equal to that of negative electrode 435. Therefore, when voltage is applied to the electric double-layer capacitor, positive electrode 434 and negative electrode 435 are polarized from the spontaneous potential by the same width. This polarization causes electrochemical reaction on the surface of the polarized electrode layer of each electrode to cause characteristic degradation such as gas generation, resistance increase, and capacity reduction, disadvantageously.

When positive electrode 434 and negative electrode 435 are wound via separator 436, positive electrode 434 becomes slightly longer than negative electrode 435, and positive electrode 434 sometimes protrudes. When the wound electric double-layer capacitor is used for a long time in a state where positive electrode 434 protrudes, the electrolyte for driving causes chemical reaction between the tip of negative electrode 435 and positive electrode 434, $BF_4^-$, $PF_6^-$ or the like of electrolyte anion is attracted to the positive electrode side, the periphery of the positive electrode becomes acidic to degrade separator 436, and the characteristic degrades, disadvantageously.

In this conventional wound electric double-layer capacitor, for improving the coupling of positive electrode lead wire 432 and negative electrode lead wire 433 to the aluminum foil of the current collector, the coupling part of each lead wire is coupled to the part of the aluminum foil that is exposed by partially removing the polarized electrode layer. Here, the polarized electrode layer is disposed on the other electrode side facing the lead wires through the separator. In the capacitor having such a structure, the potential difference between the coupling part of negative electrode lead wire 433 coupled to negative electrode 435 and positive electrode 434 facing it through separator 436 is larger than that between the other positive electrode 434 and negative electrode 435. Therefore, when this capacitor is used for a long time, the electrolyte for driving causes chemical reaction between them, $BF_4^-$, $PF_6^-$ or the like of electrolyte anion is attracted to the positive electrode side, the periphery of the positive electrode becomes acidic to degrade separator 436, and the characteristic degrades, disadvantageously.

While, an alkaline component is attracted to the negative electrode side even between the coupling part of positive electrode lead wire 432 coupled to positive electrode 434 and negative electrode 435 facing it through separator 436, and the characteristic degrades disadvantageously though separator 436 does not degrade.

This conventional wound electric double-layer capacitor is designed so that the capacity of positive electrode 434 is equal to that of negative electrode 435. Therefore, when voltage is applied to the electric double-layer capacitor, positive electrode 434 and negative electrode 435 are polarized from the spontaneous potential by the same width. This polarization causes electrochemical reaction on the surface of the polarized electrode layer of each electrode to cause characteristic degradation such as gas generation, resistance increase, and capacity reduction, disadvantageously.

The latter conventional wound electric double-layer capacitor is designed so that the capacitance of anode foil 532 is equal to that of cathode foil 533 and the sizes and shapes of them are substantially the same. Therefore, when voltage is applied to the electric double-layer capacitor, anode foil 532 and cathode foil 533 are polarized from the spontaneous potential by the same potential, charge is generated on the surface of each electrode, electrochemical reaction occurs on the surface to cause characteristic degradation such as gas generation, resistance increase, and capacity reduction.

Especially when anode foil 532 and cathode foil 533 are wound via separator 534, anode foil 532 becomes longer than cathode foil 533. When the wound electric double-layer capacitor is used for a long time in a state where anode foil 532 protrudes at the winding end of capacitor element 531, the electrolyte for driving can cause chemical reaction between the winding end of cathode foil 533 and anode foil 532, $BF_4^-$, $PF_6^-$ or the like of electrolyte anion is attracted to anode foil 532 side, the periphery of the anode foil becomes acidic to degrade separator 534.

[Patent document 1] Japanese Patent Unexamined Publication No. H10-270293

[Patent document 2] Japanese Patent Unexamined Publication No. H09-17695

[Patent document 3] Japanese Patent Unexamined Publication No. 2000-315632

SUMMARY OF THE INVENTION

The present invention addresses the conventional problems, and provides a wound electric double-layer capacitor that suppresses electrochemical reaction on the surface of a polarized electrode layer, reduces the characteristic degradation, and has high performance.

The wound electric double-layer capacitor of the present invention has the following elements:
a capacitor element formed by winding a positive electrode and a negative electrode while a separator is interposed between them;
a closed-end cylindrical metal case for storing the capacitor element together with an electrolyte for driving; and
an opening member for sealing the opening of the metal case.

Here, the positive electrode has polarized electrode layers on both surfaces of a current collector made of a metal foil, and is coupled to a lead wire. The negative electrode has polarized electrode layers on both surfaces of a current collector made of a metal foil, and is coupled to a lead wire. The polarized electrode layers formed in the negative electrode are wound at least one extra turn from the winding end of the polarized electrode layers that are formed in the positive electrode constituting the capacitor element. Thus, a part where the polarized electrode layers formed in the negative electrode face each other through the separator is formed on the outermost peripheral surface of the capacitor element.

Thus, in the wound electric double-layer capacitor of the present invention, the polarized electrode layers formed in the negative electrode are wound at least one extra turn from the winding end of the polarized electrode layers that are formed in the positive electrode of the capacitor element, and hence a part where the polarized electrode layers formed in the negative electrode face each other through the separator is formed on the outermost peripheral surface of the capacitor element. Therefore, the potential of the polarized electrode layers can be set in an electrochemically stable region where the electrolyte for driving or a member such as the current collector constituting each electrode does not cause electrochemical reaction. It is prevented that $BF_4^-$, $PF_6^-$ or the like of electrolyte anion is concentrated to the surface of the positive electrode to make the surface acidic, so that the separator does not degrade. Therefore, gas generation, resistance increase, and capacity reduction caused by the electrochemical reaction are prevented, and a wound electric double-layer capacitor that hardly undergoes characteristic degradation and has high reliability can be achieved.

A wound electric double-layer capacitor of the present invention has the following elements:
a capacitor element formed by winding a positive electrode and a negative electrode while a separator is interposed between them;
a closed-end cylindrical metal case for storing the capacitor element together with an electrolyte for driving; and
an opening member for sealing the opening of the metal case.

Here, the positive electrode has polarized electrode layers on both surfaces of a current collector made of a metal foil, and a lead wire is coupled to an exposed part of the current collector disposed in part of the polarized electrode layers. The negative electrode has polarized electrode layers on both surfaces of a current collector made of a metal foil, and a lead wire is coupled to an exposed part of the current collector disposed in part of the polarized electrode layers. The exposed part of the current collector is disposed in one of the positive electrode and negative electrode constituting the capacitor element that faces, through the separator, the coupling part of the lead wire coupled to at least the other.

The polarized electrode layers formed in the negative electrode are wound at least one extra turn from the winding end of the polarized electrode layers that are formed in the positive electrode constituting the capacitor element. Thus, a part where the polarized electrode layers formed in the negative electrode face each other through the separator is formed on the outermost peripheral surface of the capacitor element.

Thus, in the wound electric double-layer capacitor of the present invention, the part having no polarized electrode layer is disposed in one electrode of the wound capacitor element that faces, through the separator, the coupling part of the lead wire coupled to at least the other electrode. Therefore, between the coupling part of the lead wire coupled to the negative electrode and the part having no polarized electrode layer that is disposed in the facing positive electrode, it is prevented that $BF_4^-$, $PF_6^-$ or the like of electrolyte anion is attracted to the positive electrode side due to the chemical reaction of the electrolyte for driving, and hence the separator can be prevented from degrading. Also between the coupling part of the lead wire coupled to the positive electrode and the part having no polarized electrode layer that is disposed in the facing negative electrode, the alkaline component is not attracted to the negative electrode side, so that the separator can be prevented from degrading.

A wound electric double-layer capacitor of the present invention has a metal case for storing a capacitor element together with an electrolyte for driving, and a terminal plate for sealing the opening of the metal case. The capacitor element is formed by stacking a band-like anode foil and cathode foil through a band-like separator, and winding them while the cathode foil is disposed inside. The anode foil has a first drawing electrode on one longitudinal side thereof, and the cathode foil has a second drawing electrode on the other longitudinal side thereof. The cathode foil is wound at least one extra turn from the winding end of the anode foil.

A wound electric double-layer capacitor of the present invention has a metal case for storing a capacitor element together with an electrolyte for driving, and a terminal plate for sealing the opening of the metal case. The capacitor element is formed by stacking a band-like anode foil and cathode foil through a band-like separator, and winding them while the anode foil is disposed inside. The anode foil has a first drawing electrode on one longitudinal side thereof, and the cathode foil has a second drawing electrode on the other longitudinal side thereof. The cathode foil is wound at least beyond the winding end of the anode foil.

Thus, in the wound electric double-layer capacitor of the present invention, the cathode foil of the capacitor element is made longer, and is wound at least beyond the winding end of the anode foil. Therefore, the potential of the electrode can be set in an electrochemically stable region where the electrolyte for driving or a member such as the anode foil or cathode foil does not cause electrochemical reaction. Since the cathode foil is disposed on the outermost surface of the capacitor element, it is prevented that $BF_4^-$, $PF_6^-$ or the like of electrolyte anion is concentrated to the surface of the anode foil to make the surface acidic, and hence the separator does not degrade. As a result, gas generation, resistance increase, and capacity reduction caused by the electrochemical reaction are prevented, and a wound electric double-layer capacitor that hardly undergoes characteristic degradation and has high reliability can be achieved.

Figure 1:
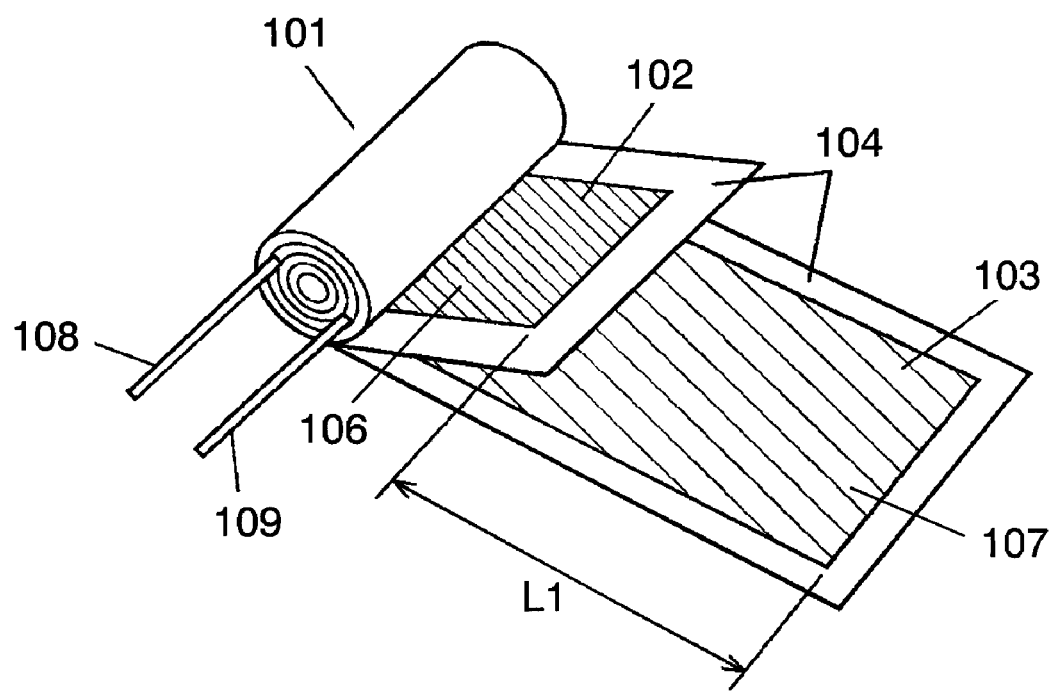
FIG. 1 is a developed perspective view showing a structure of a capacitor element used in a wound electric double-layer capacitor in accordance with a first exemplary embodiment of the present invention.

REFERENCE MARKS IN THE DRAWINGS 101 capacitor element
102 positive electrode
103 negative electrode
104 separator
105 current collector
106, 107 polarized electrode layer
108 positive electrode lead wire
109 negative electrode lead wire

DETAILED DESCRIPTION OF PREFERRED EMBODIMENTS

First Exemplary Embodiment

The first exemplary embodiment will be described hereinafter.

FIG. 1 is a developed perspective view showing a structure of a capacitor element used in a wound electric double-layer capacitor in accordance with the first exemplary embodiment of the present invention. In FIG. 1, capacitor element 101 is formed by winding positive electrode 102 and negative electrode 103 while separator 104 is interposed between them.

Positive electrode 102 is formed by disposing polarized electrode layers 106 on both surfaces of current collector 105 made of a metal foil described later, and negative electrode 103 is formed by disposing polarized electrode layers 107 on both surfaces of current collector 105. Positive electrode 102 is coupled to positive electrode lead wire 108, and negative electrode 103 is coupled to negative electrode lead wire 109. The coupling states of positive electrode lead wire 108 and negative electrode lead wire 109 are described below. As shown in detail in FIG. 2A and FIG. 2B, current collector 105 is exposed by partially removing polarized electrode layers 106 formed in positive electrode 102 (the same goes for polarized electrode layers 107 formed in negative electrode 103), and positive electrode lead wire 108 is coupled to the exposed part by cold welding or ultrasonic welding.

Polarized electrode layers 107 formed in negative electrode 103 are wound one extra turn from the winding end of polarized electrode layers 106 formed in positive electrode 102. In FIG. 1, negative electrode 103 is made longer than positive electrode 102 by L1, and hence polarized electrode layers 107 formed in negative electrode 103 face each other through separator 104 on the outermost surface.

In capacitor element 101 having such a structure, positive electrode lead wire 108 and negative electrode lead wire 109 are inserted into the holes formed in a rubber-made sealing member (not shown), and the sealing member is mounted. Capacitor element 101 is impregnated with an electrolyte for driving (not shown) and then inserted into a closed-end cylindrical metal case (not shown), and the sealing member is arranged in the opening of the metal case. The opening of the metal case is sealed with the sealing member by lateral drawing processing and curling processing.

Activated carbon powder constituting respective polarized electrode layers 106 and 107 formed in positive electrode 102 and negative electrode 103 is produced by activating raw material of wood flour base, coconut shell flour base, phenol resin base, petroleum coke base, coal coke base, or pitch base.

An example of the solvent of the electrolyte for driving includes one or a mixture of two or more of the following materials: propylene carbonate; γ-butyrolactone; ethylene carbonate; sulfolane; acetonitrile; dimethyl carbonate; diethyl carbonate; and methyl ethyl carbonate. An example of electrolyte cation includes quaternary ammonium, quaternary phosphonium, or imidazolium salt, and an example of electrolyte anion includes $BF_4^-$, $PF_6^-$, $ClO_4^-$, $CF_3SO_3^-$, or $N(CF_3SO_2)_2^-$.

Polarized electrode layers 107 formed in negative electrode 103 are wound at least one extra turn from the winding end of polarized electrode layers 106 that are formed in positive electrode 102 of capacitor element 101. Thus, a part where polarized electrode layers 107 formed in negative electrode 103 face each other through separator 104 is formed on the outermost peripheral surface of capacitor element 101. Thanks to this structure, the potentials of polarized electrode layers 106 and 107 can be set in an electrochemically stable region where the electrolyte for driving or a member such as current collector 105 constituting each of electrodes 102 and 103 does not cause electrochemical reaction. Therefore, gas generation, resistance increase, and capacity reduction caused by the electrochemical reaction are suppressed, and hence a wound electric double-layer capacitor that hardly undergoes characteristic degradation and has high reliability can be achieved.

Since polarized electrode layers 106 are formed on the surface of positive electrode lead wire 108 coupled to positive electrode 102, it is prevented that $BF_4^-$, $PF_6^-$ or the like of electrolyte anion is concentrated to the surface to make the surface acidic. As a result, separator 104 can be prevented from degrading.

The negative electrode and positive electrode may be wound together after the negative electrode is wound at least one turn at the beginning of winding. This structure also can achieve a wound electric double-layer capacitor that hardly undergoes characteristic degradation and has high reliability.

Specific examples are described hereinafter.

Example 1

A high-purity aluminum foil (Al: 99.99% or more) with a thickness of 30 μm is used as the current collector made of a metal foil, and is electrolyte-etched in a hydrochloric-acid-based etchant to roughen the surface of the aluminum foil.

Next, polarized electrode layers are formed on both surfaces of this aluminum foil. For forming the polarized electrode layers, activated carbon powder of phenol resin base of an average grain size of 5 μm, carbon black of an average grain size of 0.05 μm as a conductive adding agent, and a water-soluble binder solution in which carboxymethyl cellulose (CMC) is dissolved are mixed at weight percentage of 10:2:1, and are sufficiently kneaded by a kneader. Dispersion solvent of methanol and water is gradually added to the kneaded product, and the resultant product is further kneaded to produce paste of a predetermined viscosity. Then, this paste is applied to the surface of the aluminum foil, and dried in the atmosphere at 100° C. for one hour, thereby forming the polarized electrode layers.

Next, the aluminum foil having the polarized electrode layers is cut to the size of 40 mm×475 mm as a positive electrode, and the size of 40 mm×535 mm as a negative electrode, thereby individually producing the positive electrode and negative electrode.

Next, a positive electrode lead wire is coupled to the positive electrode, and a negative electrode lead wire is coupled to the negative electrode. In coupling each lead wire to each electrode, the polarized electrode layer formed on the surface of each aluminum foil is partially removed, and each lead wire is cold-welded to the removed part.

Then, the positive electrode and negative electrode are wound while a 35 μm-thick separator is interposed between them. Since the negative electrode is made 60 mm longer than the positive electrode, the negative electrode is wound at least one extra turn from the winding end (56.52 mm) of the positive electrode. Thus, a capacitor element (winding diameter: φ18 mm) having a part where the polarized electrode layers formed in the negative electrode face each other through the separator is produced.

Next, the capacitor element is impregnated with an electrolyte for driving. The electrolyte for driving is produced by dissolving 4-ethyl-ammonium-4-boron-fluoride in propylene carbonate.

Then, the capacitor element is inserted into a closed-end cylindrical metal case made of aluminum, the opening of the metal case is sealed using a rubber-made sealing member, thereby producing a wound electric double-layer capacitor of the present embodiment (capacitor size: (20 mm×45 mm).

Example 2

Figure 3:
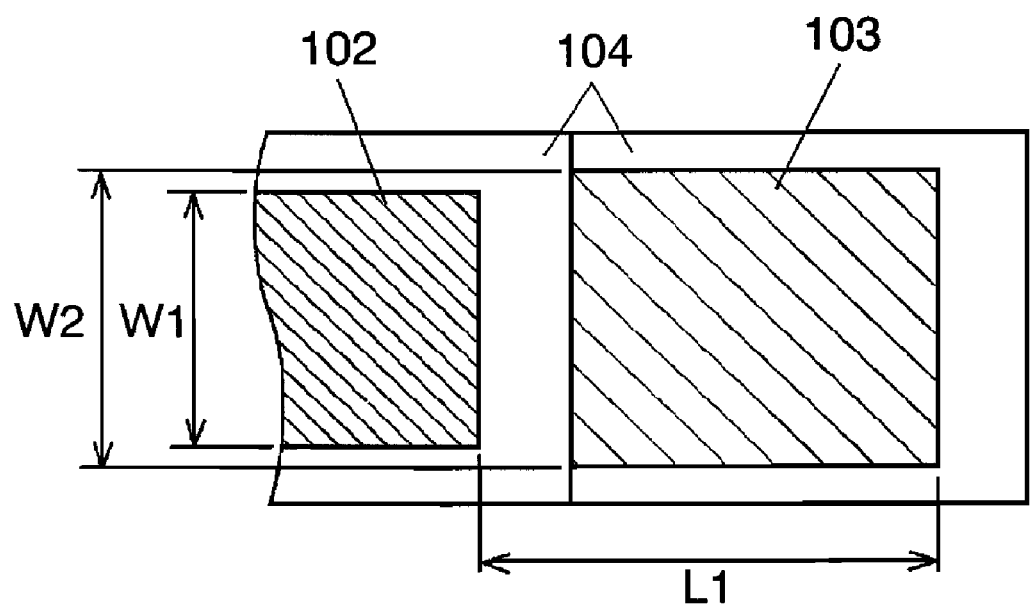
FIG. 3 is a plan view of an essential part showing a relationship between widths of a positive electrode and a negative electrode of example 2.

A wound electric double-layer capacitor is produced similarly to example 1 except that the positive electrode and negative electrode are disposed as shown in FIG. 3, width W1 of the positive electrode is set at 40 mm, and width W2 of the negative electrode is set at 44 mm.

Example 3

A wound electric double-layer capacitor is produced similarly to example 1 except that a polarized electrode layer is formed on the surface of the positive electrode lead wire coupled to the positive electrode in order to prevent the positive electrode lead wire from being exposed.

Comparative Example 1

A wound electric double-layer capacitor is produced similarly to example 1 except that the size of the negative electrode is set at 30 mm×495 mm. The negative electrode is 20 mm longer than the positive electrode, but the winding ends of the positive electrode and the negative electrode are at substantially the same position because a separator is interposed between the positive electrode and the negative electrode.

Regarding the produced wound electric double-layer capacitors of examples 1 through 3 of the present invention and comparative example 1, Table 1 shows initial characteristics (capacity and direct capacitor resistance (hereinafter referred to as "DCR")) and results of the characteristic degradation tests when voltage of 2.3 V is applied at 85° C. The number of tests is 20, and Table 1 shows the average value. The shown DCRs are obtained by calculating the gradient between 0.5 and 2.0 seconds from the start of discharge after charge.

TABLE 1

|  | Initial characteristics | | Characteristic degradation (85° C., 2.3 V, after 150 h) | | Product blister (mm) |
|---|---|---|---|---|---|
|  | Capacity (F) | DCR(mΩ) | ΔC | ΔDCR |  |
| Example 1 | 68 | 20 | −8% | 6% | 0.30 |
| Example 2 | 69 | 18 | −5% | 5% | 0.20 |
| Example 3 | 68 | 19 | −6% | 5% | 0.20 |
| Comparative example 1 | 68 | 21 | −60% | 90% | 2.30 |

As shown in Table 1, in the wound electric double-layer capacitors of the present invention, the capacity variation is smaller than that of comparative example 1, and ΔC, ΔDCR, and product blister by the characteristic degradation tests can be improved.

In the wound electric double-layer capacitors of the present invention, the polarized electrode layers formed in the negative electrode are wound at least one extra turn from the winding end of the polarized electrode layers that are formed in the positive electrode of the capacitor element. Thus, a part where the polarized electrode layers formed in the negative electrode face each other through the separator is formed on the outermost peripheral surface of the capacitor element. Therefore, the potential of the polarized electrode layers can be set in an electrochemically stable region where the electrolyte for driving or a member such as the current collector constituting each electrode does not cause electrochemical reaction. It is prevented that $BF_4^-$, $PF_6^-$ or the like of electrolyte anion is concentrated to the surface of the positive electrode to make the surface acidic, so that the separator does not degrade. Therefore, gas generation, resistance increase, and capacity reduction caused by the electrochemical reaction are prevented, and a wound electric double-layer capacitor that hardly undergoes characteristic degradation and has high reliability can be achieved.

Second Exemplary Embodiment

The second exemplary embodiment will be described hereinafter.

The schematic structure of a wound electric double-layer capacitor of the second exemplary embodiment is similar to that of the first exemplary embodiment, and is as shown in FIG. 1. Therefore, the detail description is omitted, and elements different from those of the first exemplary embodiment are mainly described using FIG. 1 and the same reference marks.

Figure 2A:
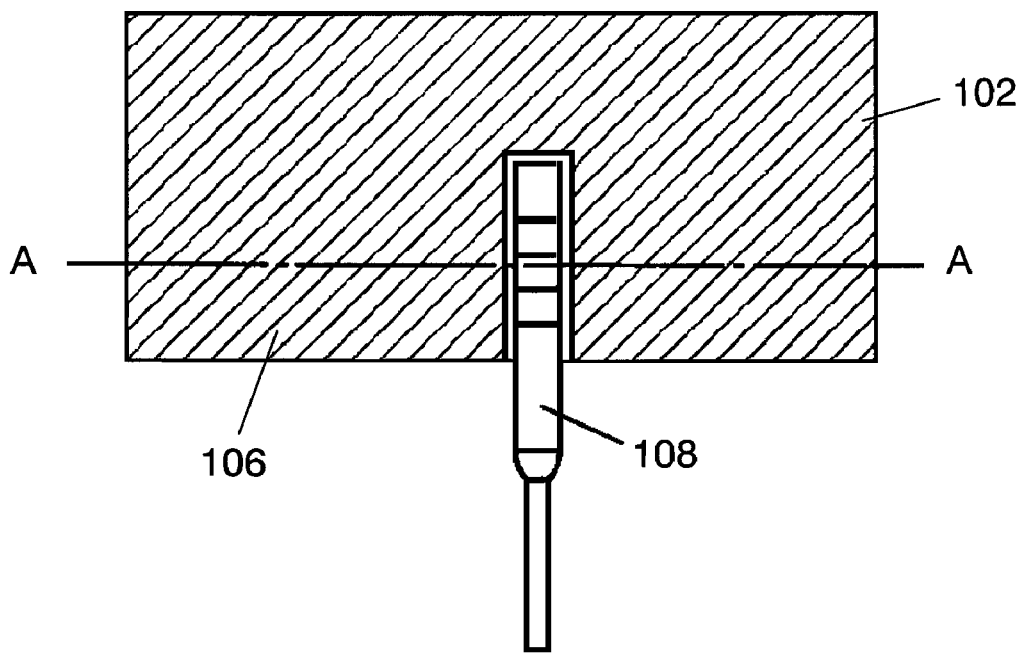
FIG. 2A is a plan view of an essential part showing a state where a positive electrode lead wire is coupled to a positive electrode constituting the capacitor element of FIG. 1.
Figure 2B:
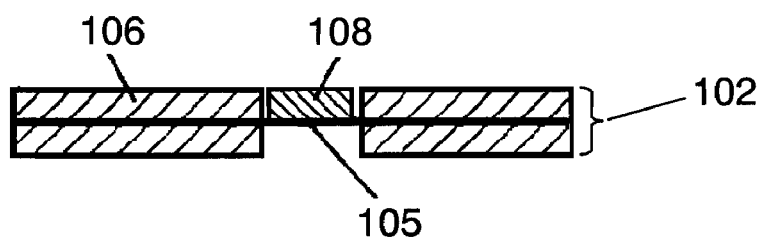
FIG. 2B is a sectional view taken on the line A-A of FIG. 2A.

The couplings of positive electrode lead wire 108 and negative electrode lead wire 109 are shown in FIG. 2A and FIG. 2B. Current collector 105 is exposed by partially removing polarized electrode layers 107 formed in negative electrode 103 (the same goes for polarized electrode layers 106 formed in positive electrode 102), and negative electrode lead wire 109 is coupled to the exposed part by cold welding or ultrasonic welding.

Figure 4:
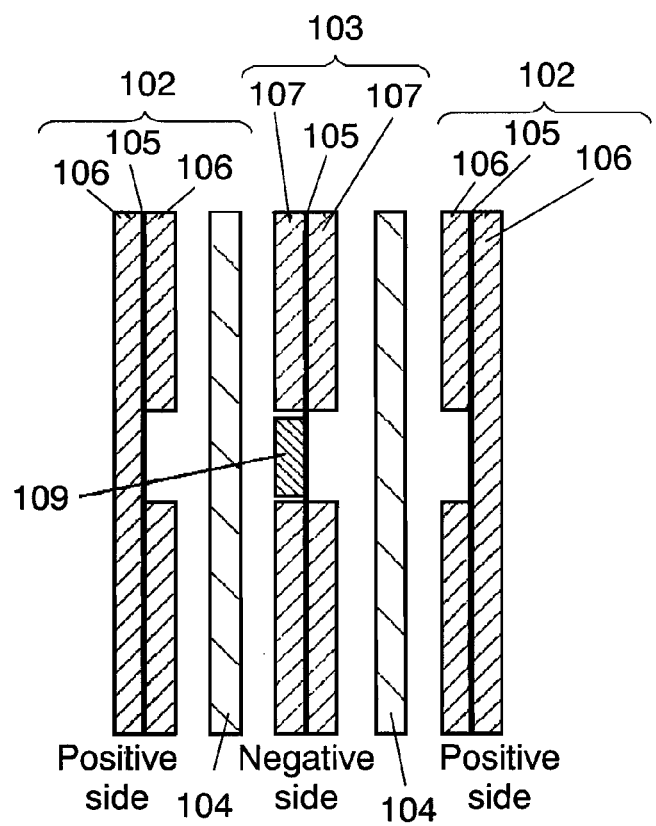
FIG. 4 is a sectional view of an essential part showing a part where a negative electrode lead wire is coupled to a negative electrode constituting a capacitor element in accordance with a second exemplary embodiment of the present invention.

In the second exemplary embodiment, as shown in FIG. 4, a part having no polarized electrode layer 106 is previously disposed in positive electrode 102 that faces the coupling part of negative electrode 103 to negative electrode lead wire 109.

In capacitor element 101 having such a structure, positive electrode lead wire 108 and negative electrode lead wire 109 are inserted into holes formed in a rubber-made sealing member (not shown), and the sealing member is mounted. Capacitor element 101 is impregnated with an electrolyte for driving (not shown) and then inserted into a closed-end cylindrical metal case (not shown), and the sealing member is arranged in the opening of the metal case. The opening of the metal case is sealed with the sealing member by lateral drawing processing and curling processing.

The activated carbon powder that constitutes respective polarized electrode layers 106 and 107 formed in positive electrode 102 and negative electrode 103, and the solvent of the electrolyte for driving may be similar to those of the first exemplary embodiment.

The part having no polarized electrode layer 106 is disposed in positive electrode 102 that faces, through separator 104, the coupling part of negative electrode lead wire 109 coupled to current collector 105 of negative electrode 103 in wound capacitor element 101. Therefore, it is prevented that $BF_4^-$, $PF_6^-$ or the like of electrolyte anion is attracted to the positive electrode side by the chemical reaction of the electrolyte for driving, and hence separator 104 can be prevented from degrading. As a result, gas generation, resistance increase, and capacity reduction caused by the electrochemical reaction are prevented, and a wound electric double-layer capacitor that hardly undergoes characteristic degradation and has high reliability can be achieved.

A polarized electrode layer may be formed on the surface of the lead wire coupled to at least the positive electrode or negative electrode. This structure also can achieve a wound electric double-layer capacitor that hardly undergoes characteristic degradation and has high reliability.

The negative electrode and positive electrode may be wound together after the negative electrode is wound at least one turn at the beginning of winding. This structure also can achieve a wound electric double-layer capacitor that hardly undergoes characteristic degradation and has high reliability.

Figure 5:
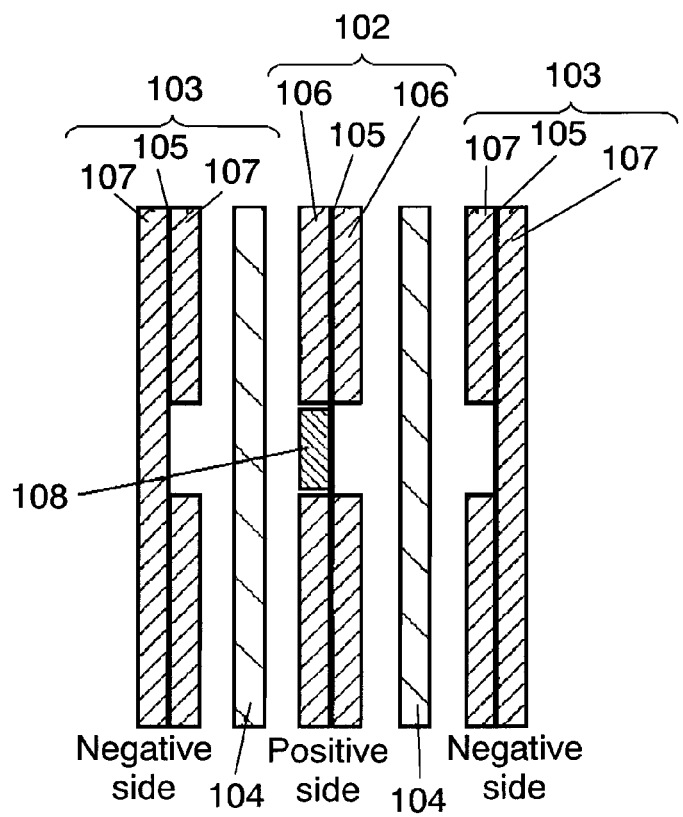
FIG. 5 is a sectional view of an essential part showing a part where a positive electrode lead wire is coupled to a positive electrode constituting the capacitor element of FIG. 4.

As shown in FIG. 5, when a part having no polarized electrode layer 107 is disposed also in negative electrode 103 that faces, through separator 104, positive electrode lead wire 108 coupled to positive electrode 102, the alkaline component is not attracted to the negative electrode side, and hence degradation of separator 104 can be suppressed.

Specific examples are described hereinafter.

Example 4

A high-purity aluminum foil (Al: 99.99% or more) with a thickness of 30 μm is used as the current collector made of a metal foil, and is electrolyte-etched in a hydrochloric-acid-based etchant to roughen the surface of the aluminum foil.

Next, polarized electrode layers are formed on both surfaces of this aluminum foil. For forming the polarized electrode layers, activated carbon powder of phenol resin base of an average grain size of 5 μm, carbon black of an average grain size of 0.05 μm as a conductive adding agent, and a water-soluble binder solution in which CMC is dissolved are mixed at weight percentage of 10:2:1, and are sufficiently kneaded by a kneader. Dispersion solvent of methanol and water is gradually added to the kneaded product, and the resultant product is further kneaded to produce paste of a predetermined viscosity. Then, this paste is applied to the surface of the aluminum foil, and dried in the atmosphere at 100° C. for one hour, thereby forming the polarized electrode layers.

Next, the aluminum foil having the polarized electrode layers is cut to the size of 40 mm×475 mm as a positive electrode, and the size of 40 mm×500 mm as a negative electrode, thereby individually producing the positive electrode and negative electrode.

Next, a positive electrode lead wire is coupled to the positive electrode, and a negative electrode lead wire is coupled to the negative electrode. In coupling each lead wire to each electrode, a part (3.5 mm×20 mm) of the polarized electrode layers formed on the surfaces of each aluminum foil is removed, and each lead wire is cold-welded to the removed part. Also in the positive electrode that faces, through the separator, the coupling part of the negative electrode lead wire when the positive electrode and negative electrode are wound, a part having no polarized electrode layer is disposed by removing a part (3.5 mm×20 mm) of the polarized electrode layers. In example 4, the area (A1) of the part of the negative electrode having no polarized electrode layer is 70 mm², and the area (B1) of the part of the positive electrode having no polarized electrode layer is 70 mm².

Then, the positive electrode and negative electrode are wound while a 35 μm-thick separator is interposed between them, thereby forming a capacitor element (winding diameter: ϕ18 mm).

Next, the capacitor element is impregnated with an electrolyte for driving. The electrolyte for driving is produced by dissolving 4-ethyl-ammonium-4-boron-fluoride in propylene carbonate.

Then, the capacitor element is inserted into a closed-end cylindrical metal case made of aluminum, the opening of the metal case is sealed using a rubber-made sealing member, thereby producing a wound electric double-layer capacitor of the present embodiment (capacitor size: ϕ20 mm×45 mm).

Example 5

A wound electric double-layer capacitor is produced similarly to example 4 except that the area of the part having no polarized electrode layer that is disposed in the positive electrode is set at 4.0 mm×25 mm. Here, the positive electrode faces, through the separator, the coupling part of the negative electrode lead wire coupled to the negative electrode. In example 5, the area (A1) of the part of the negative electrode having no polarized electrode layer is 70 mm², and the area (B1) of the part of the positive electrode having no polarized electrode layer is 100 mm².

Example 6

A wound electric double-layer capacitor is produced similarly to example 4 except that the area of the part having no polarized electrode layer that is disposed in the positive electrode is set at 5.0 mm×28 mm. Here, the positive electrode faces, through the separator, the coupling part of the negative electrode lead wire coupled to the negative electrode. In example 6, the area (A1) of the part of the negative electrode having no polarized electrode layer is 70 mm², and the area (B1) of the part of the positive electrode having no polarized electrode layer is 140 mm².

Example 7

A wound electric double-layer capacitor is produced similarly to example 4 except that the area of the part having no polarized electrode layer that is disposed in the negative electrode is set at 3.5 mm×20 mm. Here, the negative electrode faces, through the separator, the coupling part of the positive electrode lead wire coupled to the positive electrode. In example 7, the area (A1) of the part of the negative electrode having no polarized electrode layer is 70 mm², and the area (B1) of the part of the positive electrode having no polarized electrode layer is 70 mm².

Example 8

A wound electric double-layer capacitor is produced similarly to example 4 except that the size of the negative electrode is 30 mm×535 mm. Since the negative electrode is made 60 mm longer than the positive electrode, the polarized electrode layers formed in the negative electrode are wound one extra turn (53.38 mm) from the winding end of the polarized electrode layers formed in the positive electrode. Therefore, the polarized electrode layers formed in the negative electrode face each other through the separator on the outermost peripheral surface.

Comparative Example 2

A wound electric double-layer capacitor is produced similarly to example 4 except that polarized electrode layers are disposed in the positive electrode that faces, through the separator, the coupling part of the negative electrode lead wire coupled to the negative electrode.

Regarding the produced wound electric double-layer capacitors of examples 4 through 8 of the present invention and comparative example 2, Table 2 shows initial characteristics (capacity and direct capacitor resistance (DCR)) and results of the characteristic degradation tests when voltage of 2.3 V is applied at 85° C. The number of tests is 20, and Table 2 shows the average value. The shown DCRs are obtained by calculating the gradient between 0.5 and 2.0 seconds from the start of discharge after charge.

TABLE 2

| | Initial characteristics | | Characteristic degradation (85° C., 2.3 V, after 150 h) | | |
|---|---|---|---|---|---|
| | Capacity (F) | DCR(mΩ) | ΔC | ΔDCR | Product blister (mm) |
| Example 4 | 65 | 19 | −7% | 5% | 0.30 |
| Example 5 | 66 | 17 | −4% | 4% | 0.15 |
| Example 6 | 65 | 18 | −5% | 4% | 0.15 |
| Example 7 | 64 | 20 | −4% | 5% | 0.10 |
| Example 8 | 67 | 15 | −3% | 3% | 0.05 |
| Comparative example 2 | 67 | 20 | −58% | 87% | 2.20 |

As shown in Table 2, in the wound electric double-layer capacitors of examples 4 through 8 of the present invention, the capacity variation is smaller than that of comparative example 2, and ΔC, ΔDCR, and product blister by the characteristic degradation tests can be improved. There are the following reasons:

the part having no polarized electrode layer is disposed in the positive electrode that faces, through the separator, the coupling part of the negative electrode lead wire coupled to the negative electrode of the wound capacitor element; and the part having no polarized electrode layer is disposed in the negative electrode that faces, through the separator, the coupling part of the positive electrode lead wire coupled to the positive electrode.

In the wound electric double-layer capacitor in example 8, the polarized electrode layers formed in the negative electrode are wound one extra turn from the winding end of the polarized electrode layers that are formed in the positive electrode of the capacitor element. Thus, a part where the polarized electrode layers formed in the negative electrode face each other through the separator is disposed on the outermost peripheral surface. Thanks to this structure, the potential of the polarized electrode layers can be set in an electrochemically stable region where the electrolyte for driving or a member such as the current collector constituting the polarized electrode does not cause electrochemical reaction. Therefore, gas generation, resistance increase, and capacity reduction caused by the electrochemical reaction are prevented, and characteristic degradation can be further reduced.

In the wound electric double-layer capacitor of the present invention, a part having no polarized electrode layer is disposed in one electrode of the wound capacitor element that faces, through the separator, the coupling part of the lead wire coupled to at least the other. Therefore, between the coupling part of the negative electrode lead wire coupled to the negative electrode and the part having no polarized electrode layer that is disposed in the facing positive electrode, it is prevented that $BF_4^-$, $PF_6^-$ or the like of electrolyte anion is attracted to the positive electrode side due to the chemical reaction of the electrolyte for driving, and hence the separator can be prevented from degrading. Also between the coupling part of the positive electrode lead wire coupled to the positive electrode and the part having no polarized electrode layer that is disposed in the facing negative electrode, it is prevented that the alkaline component is attracted to the negative electrode side, and hence the separator can be prevented from degrading.

The polarized electrode layers formed in the negative electrode are wound at least one extra turn from the winding end of the polarized electrode layers that are formed in the positive electrode of the capacitor element. Thus, a part where the polarized electrode layers formed in the negative electrode face each other through the separator is disposed on the outermost peripheral surface. Thanks to this structure, the potential of the polarized electrode layers can be set in an electrochemically stable region where the electrolyte for driving or a member such as the current collector constituting the polarized electrode does not cause electrochemical reaction. Therefore, gas generation, resistance increase, and capacity reduction caused by the electrochemical reaction are prevented, and a wound electric double-layer capacitor that hardly undergoes characteristic degradation and has high reliability can be achieved.

Third Exemplary Embodiment

The third exemplary embodiment will be described hereinafter.

Figure 6:
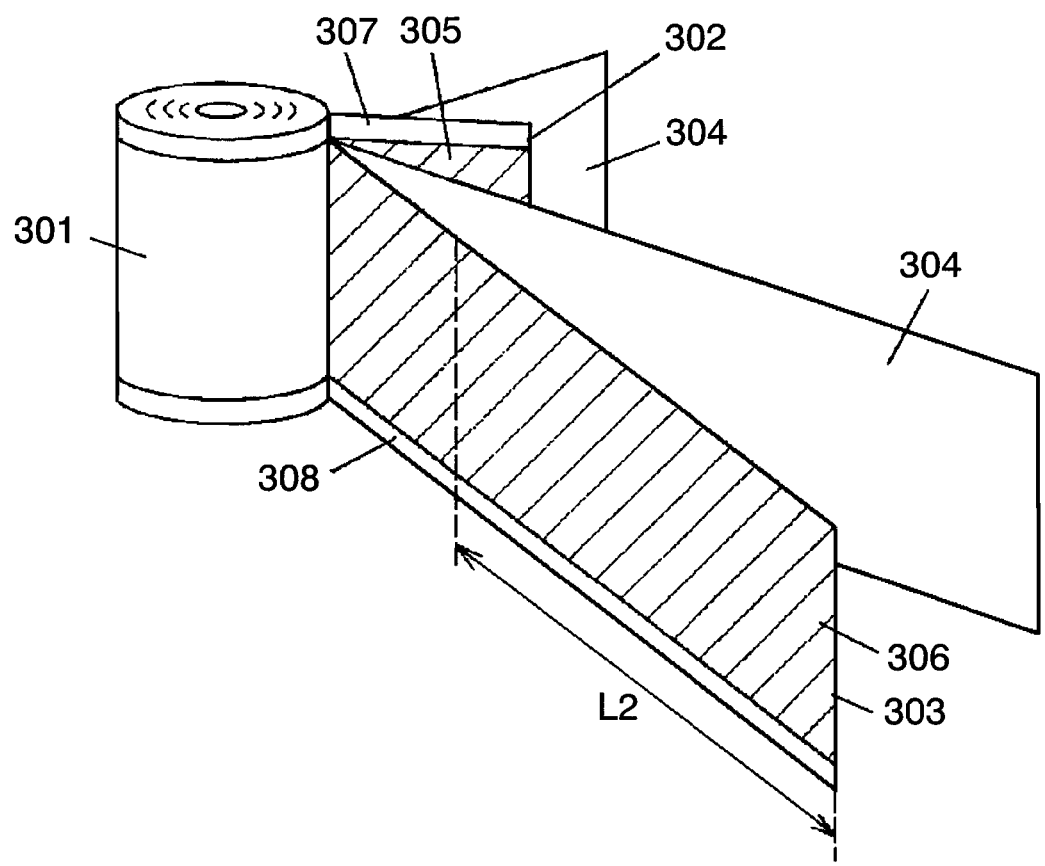
FIG. 6 is a developed perspective view showing a structure of a capacitor element used in a wound electric double-layer capacitor in accordance with a third exemplary embodiment of the present invention.

FIG. 6 is a developed perspective view showing a structure of a capacitor element used in a wound electric double-layer capacitor in accordance with the third exemplary embodiment of the present invention. In wound electric double-layer capacitor of FIG. 6, capacitor element 301 has the following elements:

a metal case (not shown, but this is a cylindrical shape having an opening upper surface, for example) for storing the capacitor element together with an electrolyte for driving; and a disk-like terminal plate for sealing the opening of the metal case with rubber for sealing.

Capacitor element 301 is described in detail. Capacitor element 301 is formed by stacking band-like anode foil 302 and band-like cathode foil 303 through band-like separator 304, and winding them while cathode foil 303 is disposed inside. Cathode foil 303 is wound an extra turn from the winding end of anode foil 302, and the winding end of cathode foil 303 is fastened with tape. In FIG. 6, cathode foil 303 is made longer than anode foil 302 by L2, and hence the outermost peripheral surface is formed of cathode foil 303.

Anode foil 302 has drawing electrode 307 as an end part of anode foil 302 on one longitudinal side thereof, and cathode foil 303 has drawing electrode 308 as an end part of cathode foil 303 on the other longitudinal side thereof. Anode foil 302 is obtained by forming polarized electrode layers 305 (described later) on both surfaces of a metal foil except the end part defining drawing electrode 307. Cathode foil 303 is obtained by forming polarized electrode layers 306 (described later) on both surfaces of a metal foil except the end part defining drawing electrode 308.

Capacitor element 301 having such a structure is impregnated with an electrolyte for driving, and then inserted into a closed-end cylindrical metal case. The terminal plate is arranged in the opening of the metal case through rubber for sealing, and the opening of the metal case is sealed by lateral drawing processing and curling processing. Drawing electrode 307 and drawing electrode 308 are welded to the inner bottom surface of the metal case and the inner surface of the terminal plate, respectively, thereby forming a wound electric double-layer capacitor.

Figure 11A:
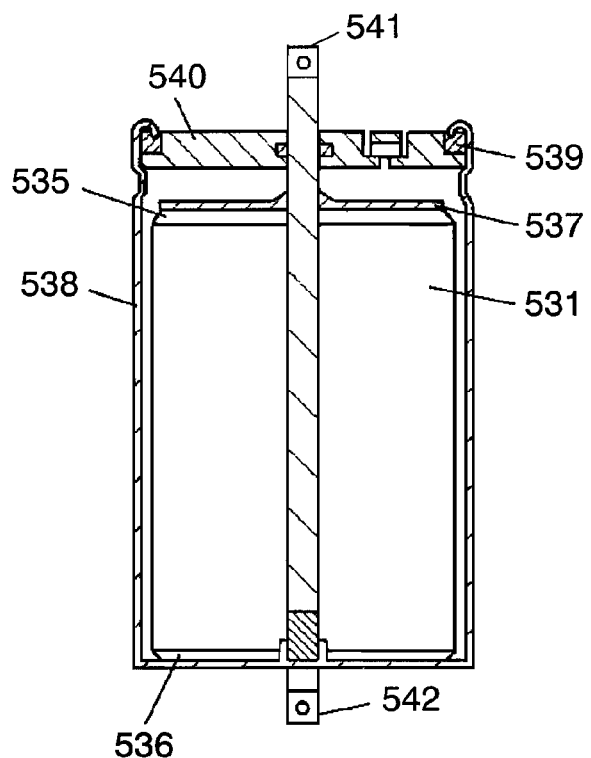
FIG. 11A is a sectional view showing a structure of another conventional wound electric double-layer capacitor.
Figure 11B:
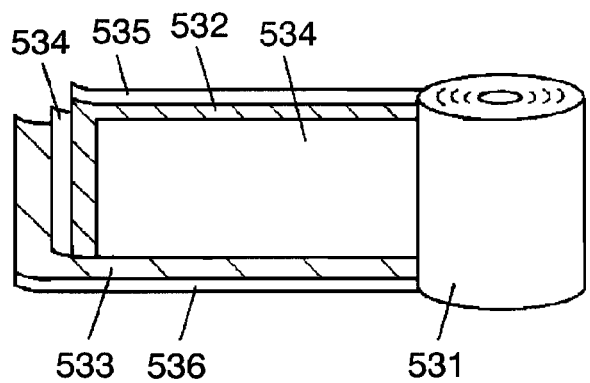
FIG. 11B is a developed perspective view showing a structure of a capacitor element used in the capacitor of FIG. 11A.
Figure 11C:
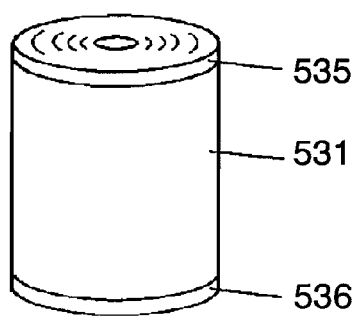
FIG. 11C is a perspective view showing the capacitor element of FIG. 11B.

The metal foil, electrolyte for driving, metal case, rubber for sealing, and terminal plate (none of them is shown) are similar to those of the conventional example of FIG. 11.

Activated carbon powder that constitutes respective polarized electrode layers 305 and 306 formed in anode foil 302 and cathode foil 303 is produced by activating raw material of wood flour base, coconut shell flour base, phenol resin base, petroleum coke base, coal coke base, or pitch base.

An example of the solvent of the electrolyte for driving includes one or a mixture of two or more of the following materials: propylene carbonate; γ-butyrolactone; ethylene carbonate; sulfolane; acetonitrile; dimethyl carbonate; diethyl carbonate; and methyl ethyl carbonate. An example of electrolyte cation includes quaternary ammonium, quaternary phosphonium, or imidazolium salt, and an example of electrolyte anion includes $BF_4^-$, $PF_6^-$, $ClO_4^-$, $CF_3SO_3^-$, or $N(CF_3SO_2)_2^-$.

Since cathode foil 303 of capacitor element 301 is wound at least one extra turn from the winding end of anode foil 302 and the outermost periphery of capacitor element 301 is formed of cathode foil 303, the potentials of anode foil 302 and cathode foil 303 are set in an electrochemically stable region where the electrolyte for driving or a member such as anode foil 302 or cathode foil 303 does not cause electrochemical reaction. It is prevented that $BF_4^-$, $PF_6^-$ or the like of electrolyte anion is concentrated to the surface of anode foil 302 to make the surface acidic, so that separator 4 does not degrade. Therefore, gas generation, resistance increase, and capacity reduction caused by the electrochemical reaction are prevented, and a wound electric double-layer capacitor that hardly undergoes characteristic degradation and has high reliability can be achieved.

Figure 7A:
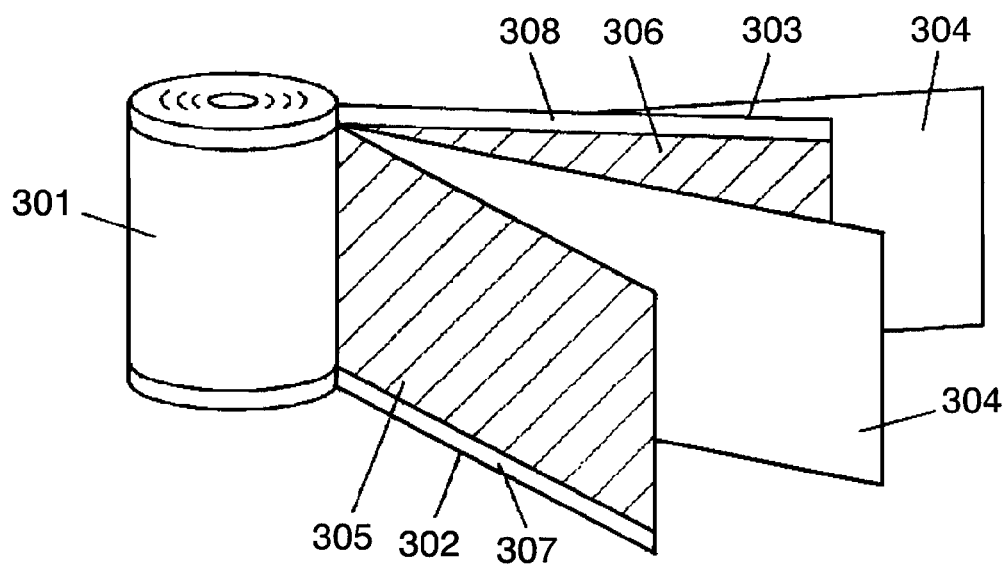
FIG. 7A is a developed perspective view showing a structure of the capacitor element of FIG. 6.
Figure 7B:
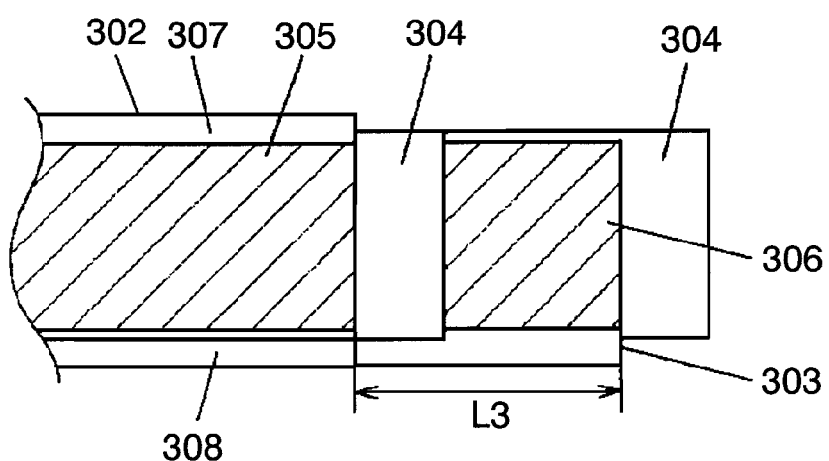
FIG. 7B is a developed view of an essential part showing a relationship between the longitudinal sizes of a anode foil and a cathode foil at the winding end of the capacitor element of FIG. 7A.

FIG. 7A is a developed perspective view showing a structure of the capacitor element used in the wound electric double-layer capacitor in accordance with the third exemplary embodiment of the present invention. FIG. 7B shows the structure of the winding end of the capacitor element of FIG. 7A. In FIG. 7A and FIG. 7B, capacitor element 301 is formed by stacking band-like anode foil 302 and band-like cathode foil 303 through band-like separator 304, and winding them while anode foil 302 is disposed inside. Cathode foil 303 is wound beyond the winding end of anode foil 302, and the winding end of cathode foil 303 is fastened with tape. In FIG. 7A and FIG. 7B, cathode foil 303 is made longer than anode foil 302 by L3, and hence the outermost peripheral surface is formed of cathode foil 303.

Figure 8:
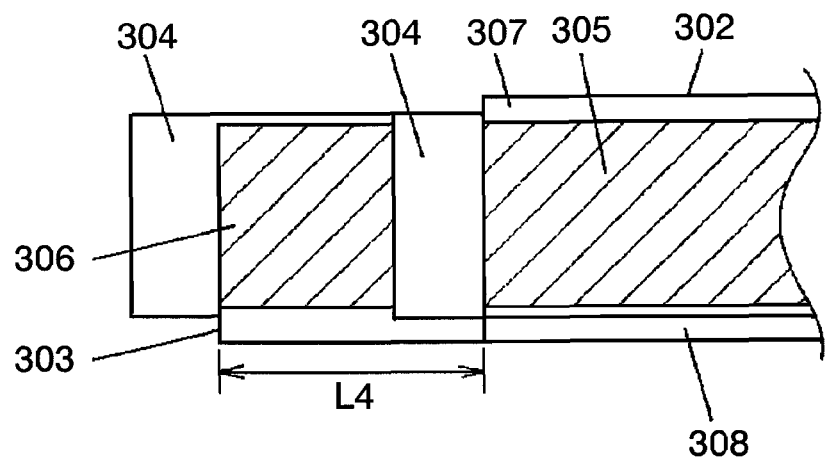
FIG. 8 is a developed view of an essential part showing a positional relationship between the anode foil and cathode foil at the beginning of winding of the capacitor element of the third exemplary embodiment.

FIG. 8 shows the structure of the beginning of the winding of capacitor element 301 used in the wound electric double-layer capacitor in accordance with the third exemplary embodiment of the present invention. Only cathode foil 303 is first wound at least one turn, namely L4, before anode foil 302 and cathode foil 303 are wound together while anode foil 302 is disposed inside. Thus, the potentials of anode foil 302 and cathode foil 303 on the innermost periphery of capacitor element 301 are set in an electrochemically stable region, so that the characteristic degradation is further reduced.

The structure where only cathode foil 303 is first wound one turn or other length is not limited to the third exemplary embodiment. The same goes for the first exemplary embodiment and second exemplary embodiment.

Figure 9:
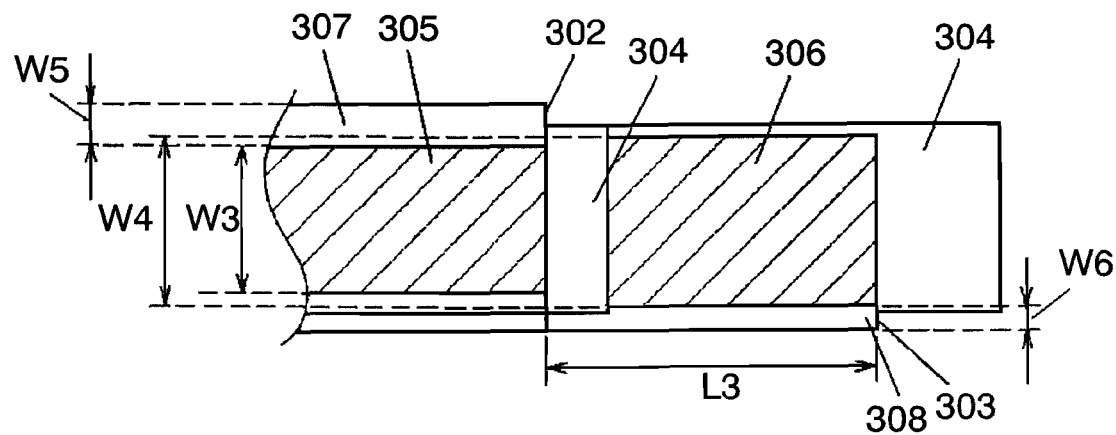
FIG. 9 is a developed view of an essential part showing a relationship between the widths of the anode foil and cathode foil at the winding end of the capacitor element of the third exemplary embodiment.
Figure 10A:
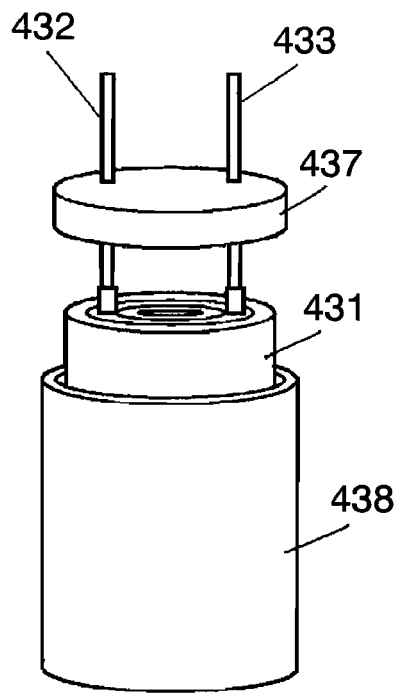
FIG. 10A is an exploded perspective view showing a structure of a conventional wound electric double-layer capacitor.
Figure 10B:
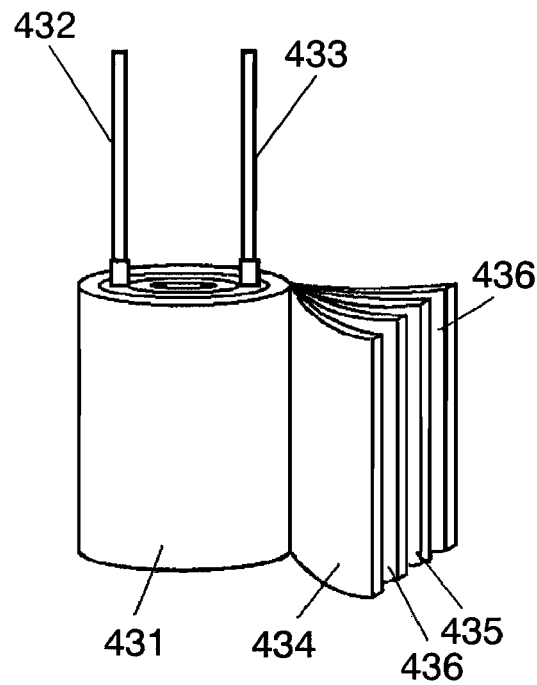
FIG. 10B is a developed perspective view showing a structure of a capacitor element used in the capacitor of FIG. 10A.

FIG. 9 shows the structure of the winding end of capacitor element 301 used in the wound electric double-layer capacitor in accordance with the third exemplary embodiment of the present invention. The width orthogonal to the longitudinal direction of cathode foil 303 is made greater than that of anode foil 302, so that the part where the end orthogonal to the longitudinal direction of anode foil 302 faces cathode foil 303 is increased on the end surface of capacitor element 301. Thanks to such a structure, the potentials of anode foil 302 and cathode foil 303 on the end surface of capacitor element 301 can be set in an electrochemically stable region, so that the characteristic degradation is further reduced.

Specific examples are described hereinafter.

Example 9

A high-purity aluminum foil (Al: 99.99% or more) with a thickness of 30 μm is used as the current collecting foil, and is electrolyte-etched in a hydrochloric-acid-based etchant to roughen the surface of the aluminum foil.

Next, polarized electrode layers are formed on both surfaces of this aluminum foil except the end thereof. For forming the polarized electrode layers, activated carbon powder of phenol resin base of an average grain size of 5 μm, carbon black of an average grain size of 0.05 μm as a conductive adding agent, and a water-soluble binder solution in which CMC is dissolved are mixed at weight percentage of 10:2:1, and are sufficiently kneaded by a kneader. Dispersion solvent of methanol and water is gradually added to the kneaded product, and the resultant product is further kneaded to produce paste of a predetermined viscosity. Then, the paste is applied to the surfaces of the aluminum foil, and dried in the atmosphere at 100° C. for one hour, thereby forming the polarized electrode layers.

Next, the aluminum foil having the polarized electrode layers with a thickness of 60 μm on both surfaces except the upper end of 5 mm is cut to the size of 45 mm×475 mm as the positive electrode side, and the size of 45 mm×535 mm as the negative electrode side, thereby forming anode foil 302 and cathode foil 303. The upper end and lower end having no polarized electrode layer are used as drawing electrodes 307 and 308, respectively.

Then, anode foil 302 and cathode foil 303 are wound while 42 mm-wide and 35 μm-thick separator 304 is interposed between them and cathode foil 303 is disposed inside. At this time, cathode foil 303 is made 60 mm longer than anode foil 302, so that the outermost periphery (56.55 mm) of anode foil 302 can be covered. As a result, capacitor element 301 (winding diameter: +17 mm) having a part where cathode foil 303 partially overlaps itself at the winding end of capacitor element 301.

Next, capacitor element 301 is impregnated with an electrolyte for driving. The electrolyte for driving is produced by dissolving tetraethylammonium fluoroborate in propylene carbonate.

Then, capacitor element 301 is inserted into a closed-end cylindrical aluminum case, the case is sealed by a terminal plate through rubber for sealing. Drawing electrodes 307 and 308 on the end surfaces of capacitor element 301 are welded to recessed parts formed in the inner bottom surface of the aluminum case and in the inner surface of the terminal plate, respectively. Thus, a wound electric double-layer capacitor (capacitor size: φ20 mm×50 mm) is produced.

The recessed parts have been formed in the inner bottom surface of the aluminum case and inner surface of the terminal plate in order to improve the coupling to drawing electrodes 307 and 308. When respective drawing electrodes 307 and 308 are sufficiently joined to the inner bottom surface of the aluminum case and inner surface of the terminal plate, however, the recessed part is not especially required.

In order to prevent the peeling of the polarized electrode layer by contact of the polarized electrode layer with the aluminum case and improve the productivity, it is recommendable that the outermost periphery of capacitor element 301 is formed of separator 304 even when the drawing electrode of cathode foil 303 is joined to the aluminum case.

When cathode foil 303 is wound an extra turn from the winding end of anode foil 302, the advantage becomes maximum. Even when the length of wound cathode foil 303 is increased, the advantage does not change.

Example 10

A wound electric double-layer capacitor is produced similarly to example 9 except for the following structure:
- band-like anode foil 302 and band-like cathode foil 303 are stacked through band-like separator 304 and wound while anode foil 302 is disposed inside; and
- cathode foil 303 is wound beyond the winding end of anode foil 302.

Specifically, as shown in FIG. 7A and FIG. 7B, the aluminum foil having the polarized electrode layers is cut to the size of 45 mm×475 mm as the positive electrode side, and the size of 45 mm×510 mm as the negative electrode side, thereby forming anode foil 302 and cathode foil 303.

Anode foil 302 and cathode foil 303 are stacked and wound using a core of φ6.0 mm while anode foil 302 is disposed inside. At this time, cathode foil 303 is 35 mm longer than anode foil 302. However, the electrodes and separator have thickness. Therefore, in an obtained capacitor element 301 (winding diameter: φ16.5 mm), cathode foil 303 is wound extra only 8 mm from the winding end of anode foil 302, and cathode foil 303 overlaps itself partially.

Using the obtained capacitor element 301, a wound electric double-layer capacitor (capacitor size: φ20 mm×50 mm) is produced.

Similarly to example 9, in order to prevent the peeling of the polarized electrode layer by contact of the polarized electrode layer with the aluminum case and improve the productivity, it is recommendable that the outermost periphery of capacitor element 301 is formed of separator 304 even when the drawing electrode of cathode foil 303 is joined to the aluminum case.

Example 11

A wound electric double-layer capacitor is produced similarly to example 10 except that the innermost periphery of capacitor element 301 is formed of cathode foil 303 by first winding only cathode foil 303 at least one turn at the beginning of the winding and then winding anode foil 302 and cathode foil 303 together.

Specifically, as shown in FIG. 8, the aluminum foil having the polarized electrode layers is cut to the size of 45 mm×475 mm as the positive electrode side, and the size of 45 mm×525 mm as the negative electrode side, thereby forming anode foil 302 and cathode foil 303. Cathode foil 303 is arranged so as to be protruded from anode foil 302 by 19 mm at the beginning of the winding, and anode foil 302 and cathode foil 303 are wound using a core of φ6.0 mm so that cathode foil 303 is first wound. Thus, capacitor element 301 is obtained. Using the obtained capacitor element 301, a wound electric double-layer capacitor (capacitor size: φ20 mm×50 mm) is produced.

In example 11, the winding is performed while cathode foil 303 is protruded. However, also when cathode foil 303 and anode foil 302 are arranged at the same position and are wound while cathode foil 303 is disposed inside, a similar advantage is bought.

Example 12

A wound electric double-layer capacitor is produced similarly to example 10 except for the following structure. The width orthogonal to the longitudinal direction of cathode foil 303 is made greater than that of anode foil 302, so that the part where the end part orthogonal to the longitudinal direction of anode foil 302 faces cathode foil 303 is increased on the end surface of capacitor element 301.

Specifically, as shown in FIG. 9, an aluminum foil having the polarized electrode layers where width W3 of polarized electrode layers 305 is 40 mm and width W5 of drawing electrode 307 is 7 mm is used as anode foil 302. An aluminum foil having the polarized electrode layers where width W4 of polarized electrode layers 306 is 42 mm and width W6 of drawing electrode 308 is 5 mm is used as cathode foil 303. Separator 304 having a width of 43 mm and a thickness of 35 µm is used.

Anode foil 302 and cathode foil 303 are stacked through separator 304 so that at least polarized electrode layers 305 are positioned inside polarized electrode layers 306, in the width orthogonal to the longitudinal direction of anode foil 302. Thus, on the end surface of capacitor element 301, the end part of polarized electrode layers 305 formed on anode foil 302 face polarized electrode layers 306 formed on cathode foil 303. Using capacitor element 301, a wound electric double-layer capacitor (capacitor size: φ20 mm×50 mm) is produced.

Comparative Example 3

A wound electric double-layer capacitor (capacitor size: φ20 mm×50 mm) is produced similarly to example 9 except that the size of the positive electrode side is 46 mm×475 mm, the size of the negative electrode side is 45 mm×490 mm, and the width of the separator is 42 mm. In the capacitor element, the negative electrode is 15 mm longer than the positive electrode. However, the separator is interposed between the positive electrode and the negative electrode, so that the winding end of the cathode foil becomes short and the anode foil is exposed.

Regarding the wound electric double-layer capacitors of examples 9 through 12 of the present invention and comparative example 3, Table 3 shows initial characteristics (capacity and direct capacitor resistance (DCR)) and results of the characteristic degradation tests when voltage of 2.3 V is applied at 85° C. The number of tests is 20, and Table 3 shows the average value.

The DCRs are obtained by calculating the gradient between 0.5 and 2.0 seconds from the start of discharge after charge.

TABLE 3

|  | Initial characteristics | | Characteristic degradation (85° C., 2.3 V, after 150 h) | | |
| --- | --- | --- | --- | --- | --- |
|  | Capacity (F) | DCR(mΩ) | ΔC | ΔDCR | Product blister (mm) |
| Example 9 | 68 | 20 | −7% | 6% | 0.25 |
| Example 10 | 68 | 20 | −8% | 6% | 0.30 |
| Example 11 | 68 | 18 | −5% | 5% | 0.20 |
| Example 12 | 68 | 19 | −6% | 5% | 0.20 |
| Comparative example 3 | 68 | 21 | −60% | 90% | 2.30 |

As shown in Table 3, in the wound electric double-layer capacitors of the third embodiment, the capacity variation is smaller than that of comparative example 3. ΔC, ΔDCR, and product blister by the characteristic degradation tests can be significantly improved comparing with comparative example 3.

As discussed above, in the present invention, cathode foil 303 is wound beyond the winding end of anode foil 302, and hence the outermost peripheral surface of capacitor element 301 is covered with cathode foil 303. Therefore, the potentials of anode foil 302 and cathode foil 303 can be set in an electrochemically stable region where the electrolyte for driving or a member such as anode foil 302 or cathode foil 303 does not cause electrochemical reaction.

It is prevented that $BF_4^-$, $PF_6^-$ or the like of electrolyte anion in electrolyte is concentrated to the surface of anode foil 302 to make the surface acidic, so that separator 304 does not degrade. Therefore, gas generation, resistance increase, and capacity variation caused by the electrochemical reaction are prevented, and a wound electric double-layer capacitor that hardly undergoes characteristic degradation and has high reliability can be achieved.

INDUSTRIAL APPLICABILITY

A wound electric double-layer capacitor of the present invention is decreased in characteristic degradation and has high reliability. Therefore, this capacitor is useful especially as an on-vehicle electronic device circuit.

The invention claimed is:

1. A wound electric double-layer capacitor comprising:
a capacitor element formed by winding a positive electrode and a negative electrode while a separator is interposed between the positive electrode and negative electrode, the positive electrode having polarized electrode layers on both surfaces of a current collector made of a metal foil and being coupled to a lead wire, the negative electrode having polarized electrode layers on both surfaces of a current collector made of a metal foil and being coupled to a lead wire;
a closed-end cylindrical metal case for storing the capacitor element together with an electrolyte for driving; and
a sealing member for sealing an opening of the metal case,
wherein the polarized electrode layers formed in the negative electrode are wound at least one extra turn from the winding end of the polarized electrode layers that are formed in the positive electrode constituting the capacitor element, and hence a part where the polarized electrode layers formed in the negative electrode face each other through the separator is formed on an outermost peripheral surface of the capacitor element.

2. The wound electric double-layer capacitor of claim 1, wherein
width of the polarized electrode layers of the negative electrode constituting the capacitor element is greater than width of the polarized electrode layers of the positive electrode.

3. The wound electric double-layer capacitor of claim 2, wherein
an exposed part of the current collector is disposed in a part of the polarized electrode layers, and the lead wire is coupled to the exposed part of the current collector.

4. The wound electric double-layer capacitor of claim 1, wherein
an exposed part of the current collector is disposed in a part of the polarized electrode layers, and the lead wire is coupled to the exposed part of the current collector.

5. The wound electric double-layer capacitor of claim 4, wherein
the polarized electrode layer is disposed on a surface of the lead wire coupled to at least the positive electrode.

6. The wound electric double-layer capacitor of claim 1, wherein
the negative electrode is first wound at least one turn at the beginning of winding, and then the negative electrode and the positive electrode are wound together.

7. A wound electric double-layer capacitor comprising:
a capacitor element formed by winding a positive electrode and a negative electrode while a separator is interposed between the positive electrode and negative electrode,
wherein the positive electrode has polarized electrode layers on both surfaces of a current collector made of a metal foil, and a lead wire is coupled to an exposed part of the current collector that is disposed in a part of the polarized electrode layers, and
wherein the negative electrode has polarized electrode layers on both surfaces of a current collector made of a metal foil, and a lead wire is coupled to an exposed part of the current collector that is disposed in a part of the polarized electrode layers;
a closed-end cylindrical metal case for storing the capacitor element together with an electrolyte for driving; and
a sealing member for sealing an opening of the metal case,
wherein the exposed part of the current collector is disposed in one of the positive electrode and the negative electrode that constitute the capacitor element, the one electrode facing, through the separator, a coupling part of the lead wire coupled to at least the other.

8. The wound electric double-layer capacitor of claim 7, wherein
exposed area of the current collector in the coupling part of the negative electrode to the lead wire is smaller than exposed area of the current collector of the positive electrode facing the coupling part.

9. The wound electric double-layer capacitor of claim 8, wherein
the exposed area of the current collector in the positive electrode that faces the coupling part is two or smaller times the exposed area of the current collector in the coupling part of the negative electrode to the lead wire.

10. The wound electric double-layer capacitor of claim 9, wherein
the lead wire coupled to one of the electrodes is used as a negative electrode.

11. The wound electric double-layer capacitor of claim 8, wherein
the lead wire coupled to one of the electrodes is used as a negative electrode.

12. The wound electric double-layer capacitor of claim 7, wherein
the lead wire coupled to one of the electrodes is used as a negative electrode.

13. A wound electric double-layer capacitor comprising:
a metal case for storing a capacitor element together with an electrolyte for driving; and
a terminal plate for sealing an opening of the metal case,
wherein the capacitor element is formed by stacking a band-like anode foil and a band-like cathode foil through a band-like separator, and winding the anode foil and cathode foil while the cathode foil is disposed inside,
wherein the anode foil has a first drawing electrode on one longitudinal side of the anode foil, and the cathode foil has a second drawing electrode on the other longitudinal side of the cathode foil, and wherein the cathode foil is wound at least one extra turn from the winding end of the anode foil.

14. The wound electric double-layer capacitor of claim 13, wherein
width orthogonal to a longitudinal direction of the cathode foil is made greater than width orthogonal to a longitudinal direction of the anode foil.

15. A wound electric double-layer capacitor comprising:
a metal case for storing a capacitor element together with an electrolyte for driving; and
a terminal plate for sealing an opening of the metal case,
wherein the capacitor element is formed by stacking a band-like anode foil and a band-like cathode foil through a band-like separator, and winding the anode foil and cathode foil while the anode foil is disposed inside,
wherein the anode foil has a first drawing electrode on one longitudinal side of the anode foil, and the cathode foil has a second drawing electrode on the other longitudinal side of the cathode foil, and
wherein the cathode foil is wound at least beyond the winding end of the anode foil.

16. The wound electric double-layer capacitor of claim 15, wherein
the cathode foil is first wound at least one turn at the beginning of winding, and then the cathode foil and the anode foil are wound together.

17. The wound electric double-layer capacitor of claim 16, wherein
width orthogonal to a longitudinal direction of the cathode foil is made greater than width orthogonal to a longitudinal direction of the anode foil.

18. The wound electric double-layer capacitor of claim 15, wherein
width orthogonal to a longitudinal direction of the cathode foil is made greater than width orthogonal to a longitudinal direction of the anode foil.

* * * * *